(12) United States Patent
Kado

(10) Patent No.: US 6,249,511 B1
(45) Date of Patent: Jun. 19, 2001

(54) APPARATUS FOR CONTROLLING CELL TRANSMISSION TIMING

(75) Inventor: Youiti Kado, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/003,800

(22) Filed: Jan. 6, 1998

(30) Foreign Application Priority Data

Jan. 8, 1997 (JP) .................................................. 9-001305
Aug. 28, 1997 (JP) .................................................. 9-232725

(51) Int. Cl.⁷ .................................................. H04L 12/56
(52) U.S. Cl. .................................................. 370/232; 370/395
(58) Field of Search .................................................. 370/389, 345, 370/428, 411, 412–417, 535, 537, 351, 230, 231, 232, 233, 234, 238

(56) References Cited

U.S. PATENT DOCUMENTS

| | | |
|---|---|---|
| 5,313,579 | 5/1994 | Chao . |
| 5,491,691 | 2/1996 | Shtayer et al. . |
| 5,517,495 * | 5/1996 | Lund et al. .......................... 370/414 |
| 5,535,201 | 7/1996 | Zheng . |
| 5,926,458 * | 7/1999 | Yin ....................................... 370/412 |

FOREIGN PATENT DOCUMENTS 7-327033   12/1995   (JP) .

OTHER PUBLICATIONS

Informative Appendix I: Implementation Examples on ABR Service Category, Traffic Management Specification Version, ATM Forum Technical Committee

* cited by examiner

*Primary Examiner*—Dang Ton
(74) *Attorney, Agent, or Firm*—Rabin & Champagne

(57) ABSTRACT

In order to reduce a storage area for storing time information necessary to manage transmission timing of a plurality of cells in an asynchronous transfer mode type exchange, a shaper for use in the ATM exchange employs a plurality of cell transmission queues each having a different class. If there occurs a cell in a connection having a cell transmission rate R, one of the cell transmission queues is specified on the basis of the cell transmission rate R, wherein the cell is registered in one of a plurality of steps in the specified cell transmission queue in accordance with the quotient given using the cell transmission rate R.

15 Claims, 7 Drawing Sheets

Fig. 3

|            | SUBn(0) | SUBn(1)        | SUBn(2)         | ... | SUBn(w)              |
|------------|---------|----------------|-----------------|-----|----------------------|
| quotient = 0 | $Q_0$   | $Q_0$          | $Q_0$           |     | $Q_0$                |
| quotient = 1 | $Q_1$   | $Q_b$          | $Q_{b^2}$       |     | $Q_{b^{(w-1)}}$      |
| quotient = 2 | $Q_2$   | $Q_{(b \times 2)}$ | $Q_{(b^2 \times 2)}$ |     | $Q_{(b^{(w-1)} \times 2)}$ |
| ...        |         |                |                 |     |                      |
| quotient = b | $Q_b$   | $Q_{(b \times b)}$ | $Q_{(b^2 \times b)}$ |     | $Q_{(b^{(w-1)} \times b)}$ |

APPARATUS FOR CONTROLLING CELL TRANSMISSION TIMING

BACKGROUND OF THE INVENTION

1. Field of the Invention

The present invention relates to an apparatus for controlling cell transmission timing, for example, in an ATM (Asynchronous Transfer Mode) exchange.

2. Description of Prior Art

As one such exchange, Japanese patent laid-open publication No. 7-327033 has taught a method and apparatus for controlling cell transmission timing. FIG. 7 depicts the configuration of the cell transmission timing controller (hereinafter, referred to as a shaper) disclosed in the publication. The shaper accommodates a plurality of connections 7 each involving a plurality of cells 8 to be transmitted. To control cell transmission, the shaper incorporates the cell interval managing unit 1, the cell transmission time managing unit 2, the cell multiplexing unit 3, the connection managing unit 4, and the unit time generating unit 5, wherein the cell transmission time managing unit 2 includes the cell transmission time table 2A, the cell interval managing unit 1 includes the cell interval table 1A, and the cell multiplexing unit 3 includes the cell transmission scheduling table 3A. The cell transmission time table 2A stores times at which cells are transmitted. The cell interval table 1A stores cell intervals between the times at which a cell (hereinafter, referred to as "preceding cell") is transmitted and the times at which a cell following the preceding cell) (hereinafter, referred to as "following cell") is transmitted.

To obtain the time at which the following cell will be transmitted, the shaper reads out of the cell interval table 2A a cell interval with respect to the preceding cell and the following cell. Thereinafter, the shaper adds the read cell interval to the time at which the preceding cell will be transmitted or has been transmitted (hereinafter, referred to as a preceding cell transmission time), thus storing the preceding cell in the cell transmission time managing unit 2A. In this way, the shaper determines the time at which the following cell will be transmitted (hereinafter, referred to as a following cell transmission time.)

Here, a unit time [seconds/cell] is defined as the period of time which one cell requires for transmission. Assuming that a cell transmission rate of one of the connections 7 is R [cells/second] and that the cell transmission rate of the shaper is P [cells/second], the cell interval in the connection is given as P/R [seconds/cell]. This indicates that a smaller cell transmission rate of a connection permits the cell interval in the connection to be longer, and vice versa.

After reading out the following cell transmission time from the cell transmission time managing table 2A, the cell transmission time managing unit 2 registers the following cell in the cell transmission scheduling table 3A in such a fashion that the following cell can be transmitted at the following cell transmission time. Once the following cell transmission time comes, the following cell is permitted to be transmitted.

As described above, if the cell transmission rate of a connection 7 is small, the cell interval in the connection 7 becomes large. Since the following cell transmission time is calculated using the cell interval with respect the preceding cell and the following cell, the large cell interval makes the following cell transmission time large. This forces the cell interval table 1A, the cell transmission time table 2A and the cell transmission scheduling table 3A to be large enough to store such large values.

Herein, assuming that the cell transmission rate or bandwidth of the shaper is 622.08 [Megabits/second], namely, $(622.08 \times 10^6)/(8 \times 53)$ [cells/second] and that the cell transmission rate R of a connection 7 is 10 [cells/second], the cell transmission scheduling table 3A requires a storage area corresponding to the cell interval more than 146,717 [seconds/cell].

SUMMARY OF THE INVENTION

It is therefore an object of the present invention to provide an apparatus for controlling cell transmission timing, which controls cell transmission in such a manner that a cell transmission rate of each connection to be controlled corresponds to a given transmission rate.

According to the present invention, an apparatus for controlling cell transmission timing, which determines following cell transmission time of transmitting a following cell that follows a preceding cell, uses the preceding cell transmission time of transmitting the preceding cell and a time interval specified by a cell transmission rate of a connection along which the preceding cell and the following cell flow, to register the following cell in a step so as to be transmitted at the following cell transmission time. The apparatus comprises an accommodation circuit accommodating a plurality of connections along which a plurality of cells flow, each of the plurality of connections allocated a cell transmission rate that is represented with a cardinal number, an exponent, and a function of a mantissa. The apparatus also includes a plurality of cell transmission queues each being allocated a bandwidth for transmitting the plurality of cells and temporarily storing the plurality of cells, each of the plurality of cell transmission queues being referred to as a class and having a plurality of steps, each of the plurality of steps being a registered one of the plurality of the cells, the registered cells shifting toward a given step that permits a cell shifted therein to be transmitted. The apparatus further includes a controlling circuit controlling the registering of the cells in one of the plurality of steps in the plurality of queues, using the cardinal number, the exponent, and the function of the mantissa of the connection of the cell.

BRIEF DESCRIPTION OF THE DRAWINGS

FIG. 3 shows a look-up table for use in retrieving a step suitable for a cell;

DESCRIPTION OF THE PREFERRED EMBODIMENTS

First Embodiment

Hereinafter, the preferred embodiments of the apparatus for controlling the cell transmission timing (shaper) according to this invention will be now described with reference to the accompanying drawings. The first embodiment of the apparatus for controlling the cell transmission timing will be explained referring to FIG. 1. The first embodiment features that upon the occurrence of a cell in a connection, a step in a cell transmission queue in which the cell should be registered, is determined on the basis of the cell transmission rate R of the connection. More specifically, when a cell occurs in a connection, the cell transmission rate R of the connection is used to give the cell transmission interval mantissa INCRE. Thereafter, the INCRE is used to give the step determination factor QUOTIENT. Finally, the exponent e and mantissa m of the cell transmission rate R, and the step determination factor QUOTIENT are used to determine the step in which the cell should be registered.

Hereinafter, note that the term "cell" is often representative of the connection in which the cell has occurred; for example, the cell registered in a step represents the connection of the cell.

Figure 1:
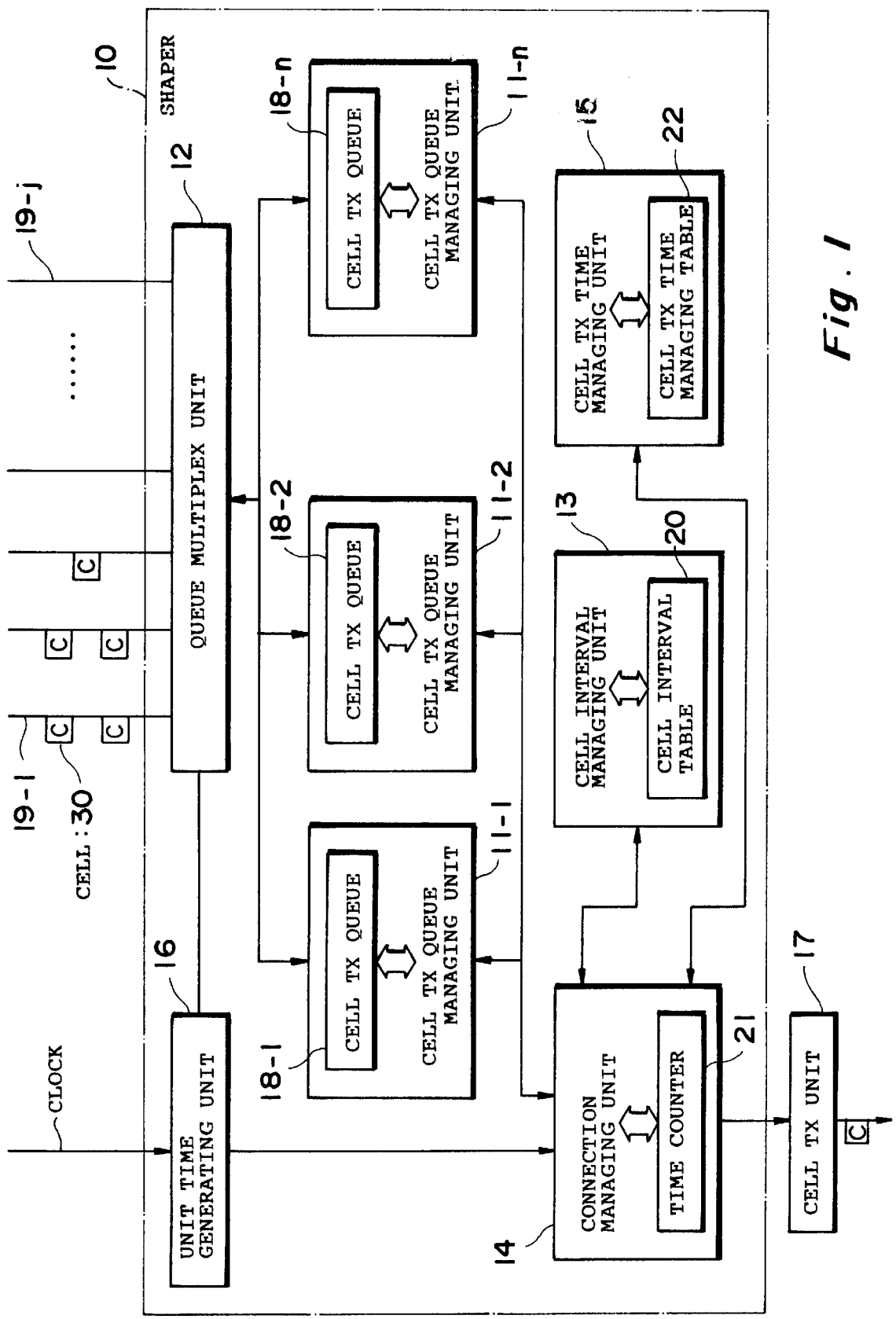
FIG. 1 shows a configuration of a shaper according to the present invention.

As shown in FIG. 1, the shaper 10 incorporates a plurality of cell transmission queue managing units 11-1~11-n, a queue multiplex unit 12, a cell interval managing unit 13, a connection managing unit 14, a cell transmission time managing unit 15, and a unit time generator 16, wherein the shaper 10 accommodates a plurality of connections 19-1~19-j through which a plurality of cells 30 pass.

The plurality of cell transmission queue managing units 11-1~11~n include a plurality of cell transmission queues 18-1~18-n, respectively. Each of the plurality of cell transmission queues 18-1~18-n has a corresponding bandwidth, wherein the bandwidth of the shaper 10 is exponentially divided into the plurality of the cell transmission queues 18-1~18-n. For example, assuming that the bandwidth of the shaper 10 is 100 Mbps, the bandwidth of the cell transmission queue 18-1 is 0~400 Kbps, the bandwidth of the cell transmission queue 18-2 is 400~1600 Kbps, the bandwidth of the cell transmission queue 18-3 is 1600~6400 Kbps, the bandwidth of the cell transmission queue 18-4 is 6400 Kbps~25.6 Mbps, and the bandwidth of the cell transmission queue 18-5 is 25.6~100 Mbps. Each of the cell transmission queue managing units 11-1~11-n manages transmission timing of cells to be transmitted which are registered in the corresponding one of the cell transmission queues 18-1~18-n.

Figure 2:
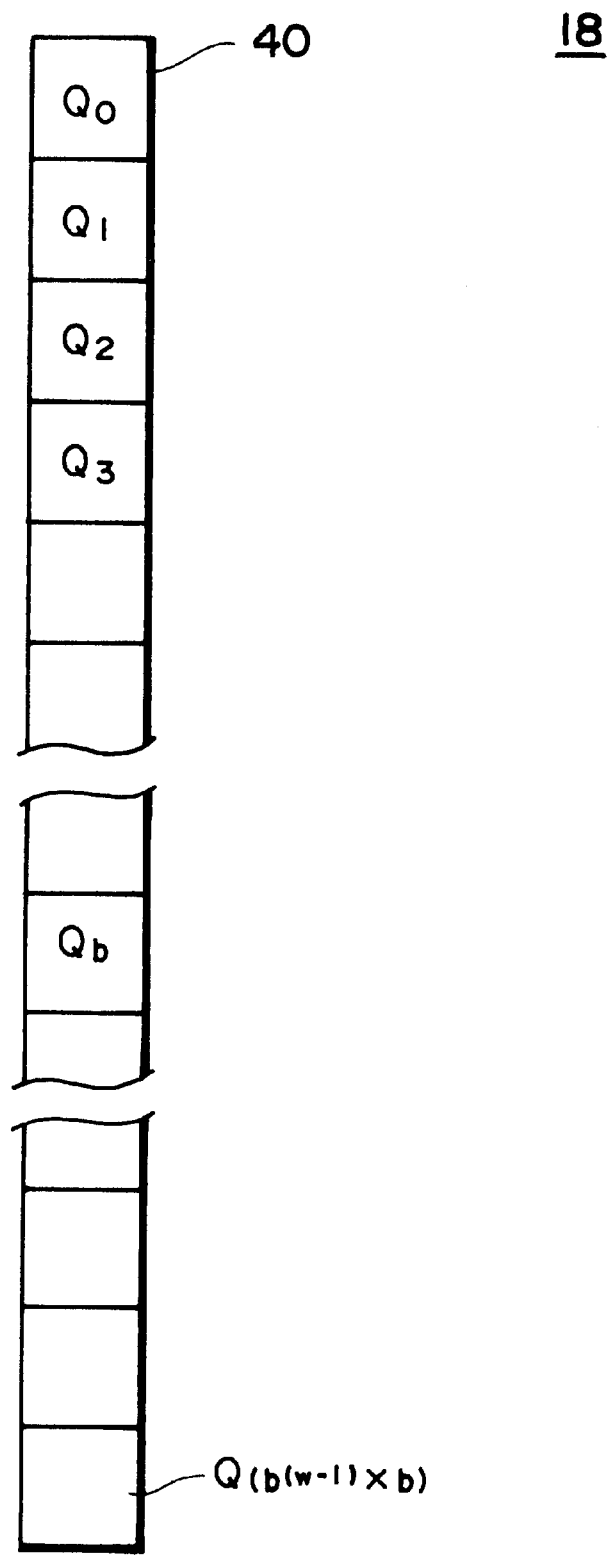
FIG. 2 shows steps in each of the cell transmission queues in the shaper of FIG. 1.

As shown in FIG. 2, each of the cell transmission queues 18-1~18-n incorporates a plurality of steps 40 which represent the order of the cells to be transmitted, wherein the head step Q0 indicates the place where a cell 30 laid therein is allowed to be transmitted and the other steps where cells laid therein must wait for transmission. If a cell arises in one of the connections 19-1~19-j, the cell experiences exchanging in the shaper 10, more definitely in one of the cell transmission queues 11-1~11-n, thus advancing to the respective destinations. Since each of the connections 19-1~19-j has been given a cell transmission rate R in advance, which is changeable with time, the cell transmission rate R serves to determine which of the cell transmission queues 18-1~18-n the cell 30 should be assigned to, and which of steps 40 in the determined one of the cell transmission queues 18-1~18-n the cell 30 should be registered in. Registered cells in each of the cell transmission queues 18-1~18-n are shifted by one step, which step is equivalent to the respective unit time of cell transmission depending upon the cell transmission rates R of the respective connections. After repeated shifting of the cells, if a cell reaches the head step Q0, the cell is allowed to depart from the step Q0 for transmission. In this way, the exchanging of the cell is completed.

Herein, the cell transmission rate R [cells/ second] will be described in detail. The cell transmission rate R is expressed as a product of an exponent and a mantissa, more definitely, is approximated to be $(b\hat{}e) \times f(m)$, where e denotes an exponent, m denotes mantissa ($0 \leq m \leq m_{max}$), b denotes a cardinal number, and f(m) denotes a monotonically increasing function ($1 \leq f(0) \leq f(1) \leq \ldots \leq f(m) \leq f(m_{max}) < b$). The maximum cell transmission rate $R_{max}$ and the minimum cell transmission rate $R_{min}$ are expressed by the expressions (1) and (2).

$$R_{max}=(b\hat{}e_{max}) \times f(m') \qquad (1)$$

$$R_{min}=(b\hat{}e_{min}) \times f(m'') \qquad (2)$$

Herein, since $e_{max}$ and $e_{min}$ denote the maximum value and the minimum value of the exponent e, both of which have been fixed in advance, if $R_{max}$ or $R_{min}$ is given, the corresponding f(m') or f(m'') is given using the expression (1) or (2).

If $m' \neq m_{max}$, the expression (3) is satisfied, while if $m'=m_{max}$, the expression (4) is satisfied.

$$R_{max}=(b\hat{}e_{max}) \times f(m') \leq P < (b\hat{}e_{max}) \times f(m'+1) \qquad (3)$$

$$R_{min}=(b\hat{}e_{max}) \times f(m_{max}) \leq P < (b\hat{}(e_{max}+1)) \times f(0) \qquad (4)$$

where P denotes the fixed cell transmission rate [cells/ second] of the shaper 10.

Returning to FIG. 1, the queue multiplex unit 12 controls a coincidence among transmission of cells that have reached the head step Q0 in each of the cell transmission queues 18-1~18-n, which permits one of them to be outputted.

The cell interval managing unit 13 notifies the connection managing unit 14 of a cell interval mantissa INCRE when there arises a cell to be transmitted in a connection, wherein the INCRE corresponds to the mantissa m of the cell transmission rate R of the connection. The INCRE is stored in the cell interval table 20. Since the cell transmission rate R is changeable with time, the INCRE is similarly changeable with time. The INCRE serves to determine the step 40 in which a cell should be registered. The INCRE stored in the cell interval table 20 is available for the other processes because the processes can utilize the INCRE without repetitive calculation using the mantissa m. The INCRE will be described in detail later.

The connection managing unit 14 carries out various processes necessary for a variety of events such as initialization, cell occurrence, and cell transmission, for each connection. For example, for each cell 30 to be transmitted, the connection managing unit 14 performs time management for cell transmission using the time counter 21, judges the cell occurrence and cell type, manages registration of the cell in a step 40 of a cell transmission queue 18, and notifies the cell transmitting unit 17 of information on the cell.

The time counter 21 develops by a specific time, which acts to select a portion of the current time NOW in accordance with each of the cell transmission rates R. The selected portion serves to manage shifting of cells that are registered in a cell transmission queue 18-1~18-n. For example, if a cell transmission rate R is large, the connection managing unit 14 selects a low order digit of the current time NOW, such as a nano-second, while if a cell transmission rate R is small, it selects a high order bit of the current time NOW, such as a second. Using the selected portion of the current time NOW, and the cell interval mantissa INCRE, the connection managing unit 14 can determine the time at which each of the cells should be transmitted without any redundancy, more definitely, which of the steps 40 each of the cells should be registered in. In summary, the connection managing unit 14 determines the preceding cell transmission time SENDTIME, using the selected portion of the current time NOW.

The cell transmission time managing unit 15 stores the preceding cell transmission time SENDTIME in the cell transmission time table 22. The unit time signal generator 16 generates some clock signals necessary for management of cell transmission.

Cell Transmission Interval Mantissa

Hereinafter, the cell transmission interval mantissa INCRE will be now described in detail. When the above expressions (1)~(4) are satisfied, the cell transmission interval mantissa INCRE is defined by the expressions (5) and (6), where k denotes an arbitrary value, and the INCRE is given through raising the decimals to a unit.

$$m \leq m': INCRE = \{R_{max}/f(m)\} \times k \quad (5)$$

$$m > m': INCRE = \{R_{max}/f(m)\} \times k \times b \quad (6)$$

When the expressions (5) and (6) are established, the expression (7) on the cell transmission mantissa INCRE is established.

$$(b^{\char`\^}e_{max}) \times k \leq INCRE < (b^{\char`\^}(e_{max}+1)) \times k \quad (7)$$

Bandwidth Division and Allocation

Hereinafter, division of the bandwidth of the shaper 10 and allocation of the divided bandwidth to the plurality of cell transmission queues 18-1~18-n will be explained. As described above, the bandwidth of the shaper 10 is exponentially divided. The division is into a plurality of small bandwidths by $1/(b^{\char`\^}w)$, where w denotes a positive integer. The small bandwidths are allocated to the plurality of cell transmission queues 18-1~18-n, respectively. Here, one of the cell transmission queues 18-1~18-n that is allocated the largest bandwidth, is referred to as the class 0, another is allocated a bandwidth smaller that the largest bandwidth is referred to as the class 1, and the others are referred to likewise. As a result, the cell transmission queue 18 that is allocated the smallest bandwidth is referred to as the class $n_{max}$. All of the small bandwidths are represented by the following expressions (8-1)~(8-7), where A=f(m'+1), B=f (m'), C=f(m''), $b^{\char`\^}(e_{max}-(n_{max}+1) \times w) \times A(b^{\char`\^}e_{max}) \times C$ are established.

$$class\ 0: (b^{\char`\^}(e_{max}-w)) \times A < R0 \leq (b^{\char`\^}(e_{max})) \times B \quad (8\text{-}1)$$

$$class\ 1: (b^{\char`\^}(e_{max}-2w)) \times A < R1 \leq (b^{\char`\^}(e_{max}-w)) \times B \quad (8\text{-}2)$$

$$class\ 2: (b^{\char`\^}(e_{max}-3w)) \times A < R2 \leq (b^{\char`\^}(e_{max}-2w)) \times B \quad (8\text{-}3)$$

$$class\ n\text{-}1: (b^{\char`\^}(e_{max}-nw)) \times A < Rn\text{-}1 \leq (b^{\char`\^}(e_{max}-(n\text{-}1)w)) \times B \quad (8\text{-}4)$$

$$class\ n: (b^{\char`\^}(e_{max}-(n+1)w)) \times A < Rn \leq (b^{\char`\^}(e_{max}-nw)) \times B \quad (8\text{-}5)$$

$$class\ (n_{max}\text{-}1): (b^{\char`\^}(e_{max}-(n_{max}]w)) \times A < Rn_{max}\text{-}1 \leq (b^{\char`\^}(e_{max}-(n_{max}w)) \times B \quad (8\text{-}6)$$

$$class\ n_{max}: (b^{\char`\^}(e_{min})) \times C < Rn_{max} \leq (b^{\char`\^}(e_{max}-(n_{max})w)) \times B \quad (8\text{-}7)$$

Each of the above bandwidths incorporates further a plurality of columns. Herein, each of the columns are referred to as a sub-class. For example, assuming the class n involves a plurality of sub-classes SUBn(0)~SUBn(w), the bandwidths Rn(0)~Rn(w) of the sub-classes n(0)~n(w) are defined as the expressions (9-1)~(9-3).

$$(b^{\char`\^}(e_{max}-nw-1)) \times A < Rn0 \leq (b^{\char`\^}(e_{max}-nw)) \times B \quad (9\text{-}1)$$

$$(b^{\char`\^}(e_{max}-nw-2)) \times A < Rn1 \leq (b^{\char`\^}(e_{max}-nw-1)) \times B \quad (9\text{-}2)$$

$$(b^{\char`\^}(e_{max}-nw-w)) \times A < Rnw \leq (b^{\char`\^}(e_{max}-nw-w+1)) \times B \quad (9\text{-}3)$$

The above bandwidths Rn0~Rnw correspond to the sub-classes SUBn(0)~SUBn(w) in FIG. 3, respectively. In other word, assuming that b, w, and m are provided, in the case of class n, given e and m, one of bandwidths Rn0~Rnw is obtained, that is, one of the sub-classes SUBn(0)~SUBn(w) is obtained.

Registration of Cell in Step

Registration of cells will be described, hereinafter. FIG. 3 shows a lookup table for retrieving a step in which a cell 30 should be registered. Provided that there arises a cell 30 in a connection 19, the cell transmission rate R, which is one of rates R0~$Rn_{max}$, specifies the one of the classes 0~$n_{max}$ to which the cell 30 should be assigned. In the class specified by the cell transmission rate R, one of the sub-classes in which the cell should be registered, for example, one of the sub-classes SUBn(0)~SUBn(w), is designated through the above procedure. Further, given a step determination factor QUOTIENT, the step 40 in which the cell 30 should be registered is retrieved, using the sub-class SUB and the step determination factor QUOTIENT over the look-up table. After determination of the step 40, the cell 30 is set into the step 40 of the cell transmission queue 18 corresponding to the step 40 determined in the look-up table.

Shifting Cell

Hereinbelow, shifting registered cells will be described. The cells 30 laid in the steps 40 are shifted to the respective neighboring steps toward the head step Q0. For example, the cell in the step Q1 is shifted to the step Q0, the cell in the step Q2 is shifted to the step Q1, and the other cells in the other steps are shifted likewise. The frequency of shifting in a cell transmission queues 18 depends upon the class thereof, and more specifically the frequency of shifting is in proportion with the cell transmission rate of the class. Therefore, for example, the frequency of shifting in the cell transmission queue 18-1 differs from that in the cell transmission queue 18-n. The shifting operation is indicated in detail by class in the following.

$$class\ 0: one\ time\ per\ unit\ time \quad (10\text{-}1)$$

$$class\ 1: one\ time\ per\ b^{\char`\^}w\ unit\ time \quad (10\text{-}2)$$

$$class\ 2: one\ time\ per\ b^{\char`\^}(w \times 2)\ unit\ time \quad (10\text{-}3)$$

$$class\ n\text{-}1: one\ time\ per\ b^{\char`\^}(w \times (n-1))\ unit\ time \quad (10\text{-}4)$$

$$class\ n: one\ time\ per\ b^{\char`\^}(w \times n)\ unit\ time \quad (10\text{-}5)$$

$$class\ n_{max}\text{-}1: one\ time\ per\ b^{\char`\^}(w \times (n_{max}-1))\ unit\ time \quad (10\text{-}6)$$

$$class\ n_{max}: one\ time\ per\ b^{\char`\^}(w \times (n_{max}))\ unit\ time \quad (10\text{-}7)$$

Setting of Cell Transmission Timing

Hereinafter, the operation from cell occurrence to cell transmission will be described. First, the cell interval managing unit 13 determines which of the cell transmission queues 18-1~18-n the cell 30 that has occurred in a connection 19 should be assigned to, and also which of the steps 40 in the cell transmission queue 18 the cell should be registered in, using cell transmission rate R of the connection 19. For example, when there arises a cell 30 in a connection 19-1, the cell transmission rate R of the connection 19-1 serves to determine which of the cell transmission queues 18-1~18-n the cell should be assigned to, and further, which of the steps in the determined one of the cell transmission queues 18-1~18-n the cell should be registered. In case of a first cell, however, the cell is registered in a head step, namely, the step Q0, whichever cell transmission queue 18 the cell 30 is assigned to. In most cases, a cell 30 is registered in a step other than the head step Q0. The cells registered in those steps in a cell transmission queue 18 shift toward the head step Q0. Once a cell reaches the head step Q0, the cell is allowed to leave the cell transmission queue 18, namely, to be transmitted. If, for example, transmitting a cell in a head step Q0 of a cell transmission queue 18-1 and transmitting another cell in a head step Q0 of another cell transmission queue 18-2 are coincident with each other, the coincidence is adjusted, which permits the cells to be transmitted one by another.

When there occurs a following cell, which follows the first cell, in the same connection 19-1, the connection managing unit 14 notifies the cell interval managing unit 13 of the cell occurrence. The cell interval managing unit 13 calculates the cell transmission interval mantissa INCRE, using the mantissa m of the cell transmission rate R of the connection 19-1, thereby obtaining an addition SUM that is defined by the expression (11).

$$\text{SUM} = T + \text{INCRE} \tag{11}$$

where the time counter T denotes the mantissa of the preceding cell transmission time SENDTIME.

Furthermore, the step determination factor QUOTIENT is obtained using the expression (12).

$$\text{QUOTIENT} = \text{floor }(\text{SUM}, (b^{\hat{}}e_{max}) \times k) \tag{12}$$

where the function "floor" gives the quotient of dividing the SUM by the $((b^{\hat{}}e_{max}) \times k)$.

Thereafter, the time counter T experiences, an increment according to the following expression (13).

$$T = \text{SUM} - \text{QUOTIENT} \times ((b^{\hat{}}e_{max}) \times k) \tag{13}$$

The new time counter T, which is rounded up or rounded down, will be used for obtaining the QUOTIENT when a further following cell occurs. In addition, the step determination factor QUOTIENT and the cell transmission interval mantissa INCRE satisfy the following expressions (14) and (15).

$$1 \leq \text{QUOTIENT} \leq b \tag{14}$$

$$T < (b^{\hat{}}e_{max}) \times k \leq \text{INCRE} < (b^{\hat{}}(e_{max}+1)) \times k \tag{15}$$

The cell interval managing unit 13 determines a cell transmission queue 18 to which the cell 30 should be assigned, and a step 40 in which the 40 cell should be registered, using the cell transmission rate R and the step determination factor QUOTIENT, wherein the step 40 in which the cell 30 should be registered is determined pursuant to a rule as follows.

(A) In a case in which $b^{\hat{}}\{e_{max}-(w \times n)-1\} \times f(m'+1) < R \leq b^{\hat{}}\{(e_{max}-w \times n) \times f(m')\}$:

If QUOTIENT=0, then register the cell in step Q0
If QUOTIENT=1, then register the cell in step Q1
If QUOTIENT=2, then register the cell in step Q2
. . .
If QUOTIENT=b, then register the cell in step Qb (B) In a case in which
$b^{\hat{}}\{e_{max}-w \times (n-2)) \times f(m'+1)\} < R \leq b^{\hat{}}\{(e_{max}-w \times (n-1)) \times f(m')\}$:

If QUOTIENT=0, then register the cell in step Q0
If QUOTIENT=1, then register the cell in step Qb
If QUOTIENT=2, then register the cell in step Q(b×2)
. . .
If QUOTIENT=b, then register the cell in step Q(b×b)

(C) In a case in which
$b^{\hat{}}\{e_{max}-w \times (n-w)) \times f(m'+1) < R \leq b^{\hat{}}\{(e_{max}-w \times (n-w+1)) \times f(m')\}$:

If QUOTIENT=0, then register the cell in step Q0
If QUOTIENT=1, then register the cell in step Q(b^(w-1))
If QUOTIENT=2, then register the cell in step Q(b^{(w-1)×2})
. . .
If QUOTIENT=b, then register the cell in step Q(b^{(w-1)×b})

As described above, in the first embodiment of the apparatus for controlling cell transmission timing, the bandwidth of the shaper 10 has been exponentially divided into a plurality of small bandwidths, while each of the connections is allotted a cell transmission rate R, which is expressed using an exponent e and a mantissa m. The small bandwidths are allocated to a plurality of the cell transmission queues 18-1~18-n. In each of the cell transmission queues 18-1~18-n a plurality of steps 40 are involved, wherein only the cell 30 laid in the head step Q0 is allowed to be transmitted.

Figure 4:
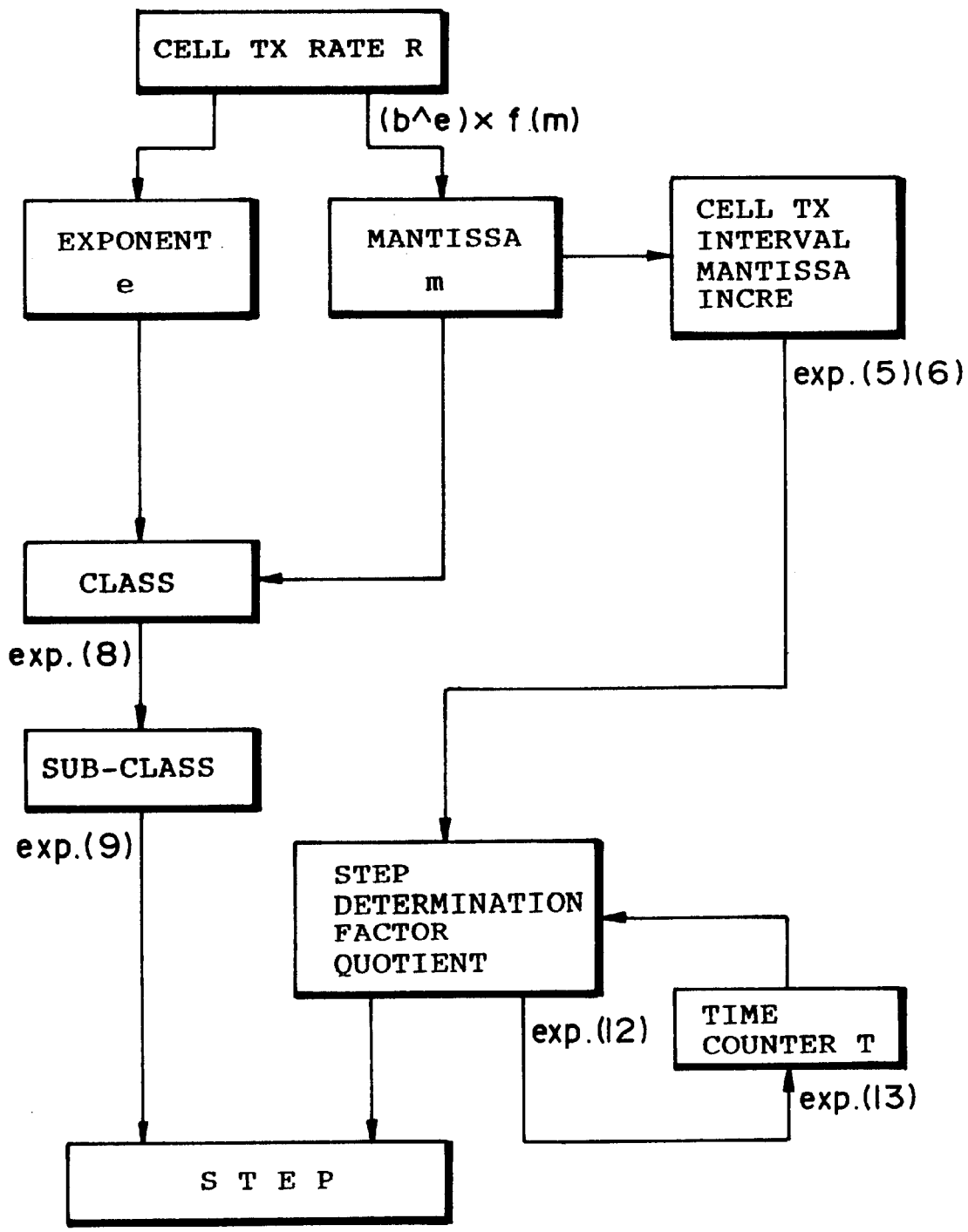
FIG. 4 is a flowchart showing a procedure for calculating the step in the first and second embodiments of the shaper.

In summary, as shown in FIG. 4, if there occurs a cell 30 in a connection 19 having a cell transmission rate R, the step 40 in the cell transmission queue 18 is determined using the cell transmission rate R. More specifically, the step 40 is determined using the exponent e-and the mantissa m with reference to a look-up table shown in FIG. 3, wherein the exponent e serves to specify the class and the sub-class while the mantissa m serves to specify the step determination factor QUOTIENT. Thereafter, the step 40 is designated on the basis of the specified class, sub-class, and QUOTIENT. Finally, the cell 30 is registered in the designated step 40, and the cell transmission queue 18 is specified by the class.

Since the cell transmission rate R of the connection and the bandwidth of the cell transmission queues 18 are defined in terms of exponent and mantissa, the storage area that stores the period of time used for managing cell transmission can be reduced in comparison with the conventional art.

For example, assuming that the bandwidth of the shaper 10 is 622.08 [Megabit/second], the bandwidth of a connection is 10[cell/second], the cardinal number b is 2, and w is 2, then the number of the classes becomes nine and the number of the steps becomes five. The total number f of steps becomes 45 (=5×9), which is enough to manage the cell transmission. Further, in contrast with the conventional art, if the bandwidth P of the shaper 10 becomes double, the total number of steps increases only to $\log_2 (P+1)/\log_2 P$, which facilitates expanding the capacity of the shaper 10.

Further, the embodiment involves determining the time of transmitting a cell using the cell transmission interval mantissa INCRE reduces to m'+1, pre-calculations employing real numbers necessary to obtain the INCRE.

Second Embodiment

Hereinafter, the second embodiment of the apparatus for controlling the cell transmission timing according to this invention will be described. The configuration and function of the second embodiment is similar to those of the first embodiment, wherein the difference therebetween is that another function of the cell interval managing unit 13 is added to the second embodiment. More specifically, the additional function is to control or manage a suspension and a delay of a following cell.

Figure 5:
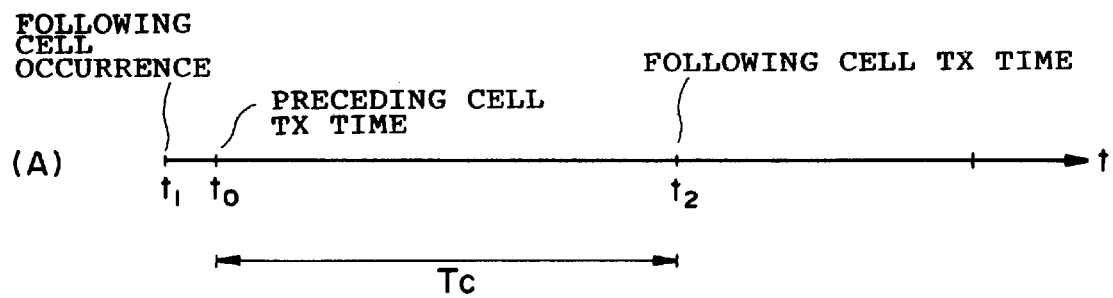
FIG. 5 is a timing chart showing transmitting a following cell, FIG. 5(A) of which shows a cell transmission in an ordinary case, FIG. 5(B) of which shows a cell transmission in a delay case, and FIG. 5(C) of which shows a cell transmission in a recovery case.
Figure 5:
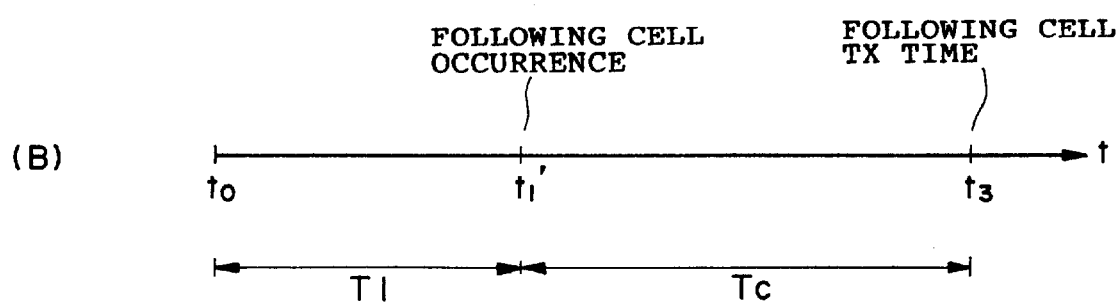
Figure 5:
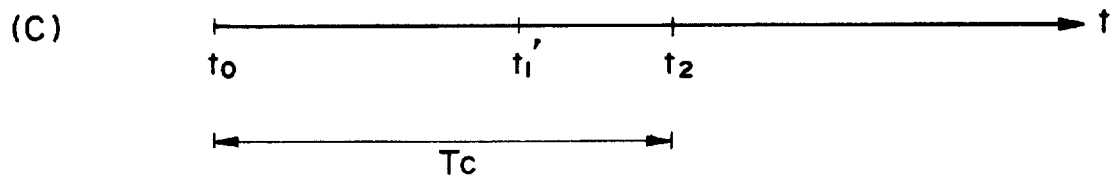

As shown in FIG. 5(A), in an ordinary case of the first embodiment, since the following cell occurs around the time to of transmitting the preceding cell, the following cell can be transmitted at the time t2 specified with both of the time t0 of the preceding cell transmission and the time of period Tc, wherein the time of period Tc is defined as the interval between the time of the ordinary preceding cell occurrence and the ordinary following cell occurrence.

As shown in FIG. 5(B), however, if the following cell occurs at the time (t1') at which a long period of time T1 elapses since the time t0, the following cell is registered in such a manner that the following cell will be transmitted at the time t3 specified with the time t1' and the period of time Tc. Accordingly, the following cell fails to be transmitted at the time t2. As shown in FIG. 5(C), the second embodiment enables the delayed following cell to be transmitted at the time t2.

Hereinafter, the operation of the second embodiment will be explained in detail. In the second embodiment, when the cell interval managing unit 13 obtains the time difference between the preceding cell transmission time SENDTIME denoting the time of transmitting the preceding cell and the following cell transmission time THETIME denoting the time of transmitting the following cell, to correct the time of transmitting the following cell.

More definitely, first, the cell interval managing unit 13 obtains the time difference T1 between the time t0 and the time t1'. Next, it divides the time difference T1 by the unit time $b^{\char`\^}(e_{max}-e)$, thus converting the time difference T1 into the number of steps $(t1'-t0)/(b^{\char`\^}(e_{max}-e))$. Finally, it subtracts the number of steps $(t1'-t0)/(b^{\char`\^}(e_{max}-e))$ from the step determination factor QUOTIENT, thereby determining the step 40 in which the following cell should be actually registered. In this way, the step determination factor QUOTIENT is adjusted. This procedure is defined by the expressions (16) and (17).

$$\text{if } m \leq m', \text{ then QUOTIENT=max } (0, \{\text{QUOTIENT}-(\text{THETIME}-\text{SENDTIME})/(b^{\char`\^}(e_{max}-e))\}) \qquad (16)$$

$$\text{if } m > m', \text{ then QUOTIENT=max } (0, \{\text{QUOTIENT}-(\text{THETIME}-\text{SENDTIME})/(b^{\char`\^}(e_{max}-e-1))\}) \qquad (17)$$

For example, assuming that the time difference T1 is two time units and the original step determination factor QUOTIENT Tc is given as three time units, the step determination factor QUOTIENT is corrected to one time unit, which permits the following cell to be registered in the step 40 corresponding to the corrected step determination factor QUOTIENT, one unit time.

As described above, in accordance with the second embodiment, even if the occurrence of the following cell is delayed, the following cell can be registered so as to be transmitted at the time at which the following cell must be transmitted primarily.

Third to Fifth Embodiments

Hereinbelow, the third to fifth embodiments will be now described. Prior to detailing those embodiments, outlines thereof will be explained referring to FIG. 6.

In comparison with the above-described first and second embodiments, all of the following embodiments feature extracting or selecting a portion from the current time for each of the connections 19, namely, for each of the cell transmission queues 18. This has been already discussed in the explanation of the time counter 21. Such a function leads to saving or reducing storage area for storing information with respect to time. In addition to this feature, the embodiments have respective features discussed below.

Figure 6:
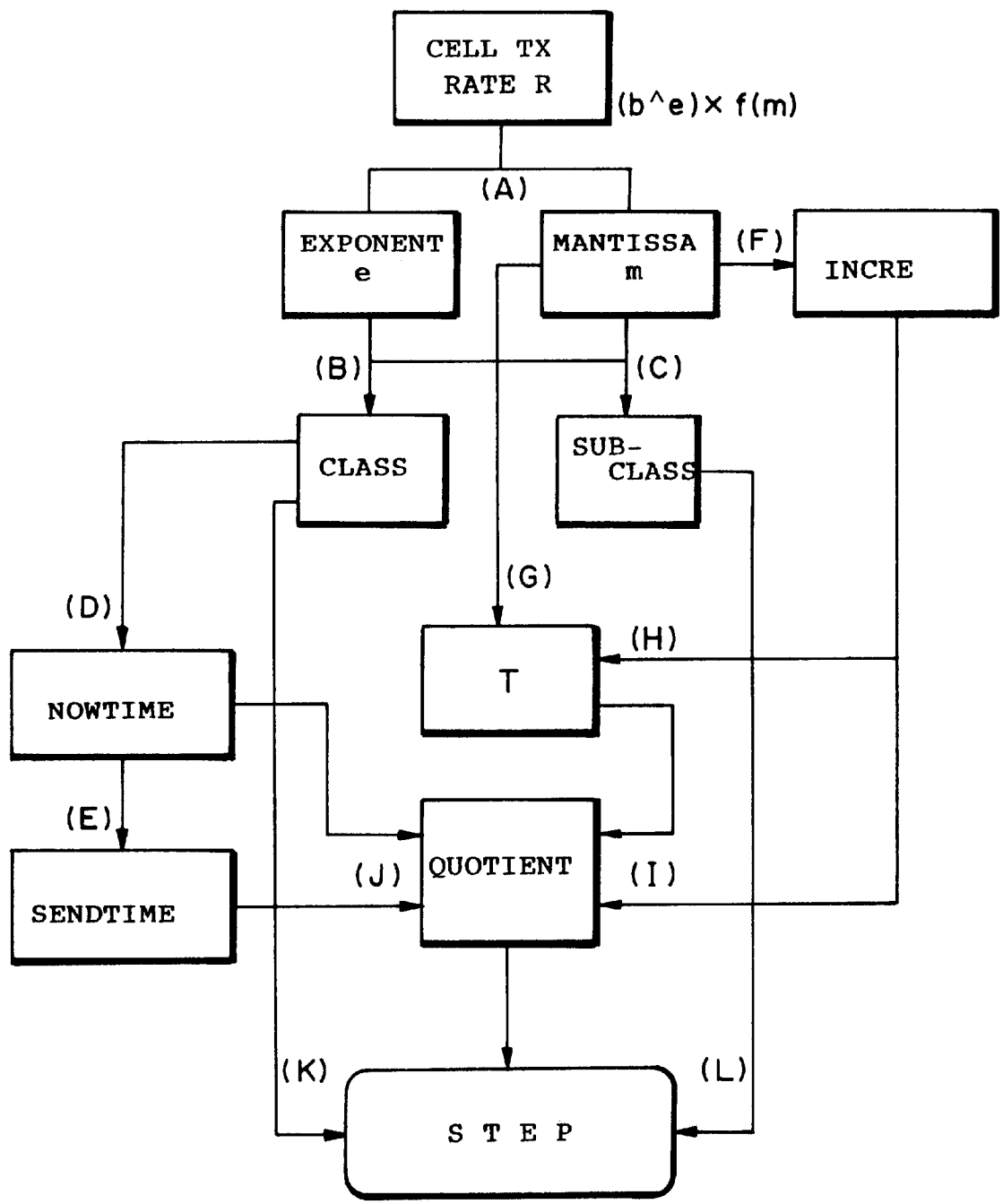
FIG. 6 is a flowchart showing a procedure of calculating the step in the third, fourth, and fifth embodiments of the shaper.
Figure 7:
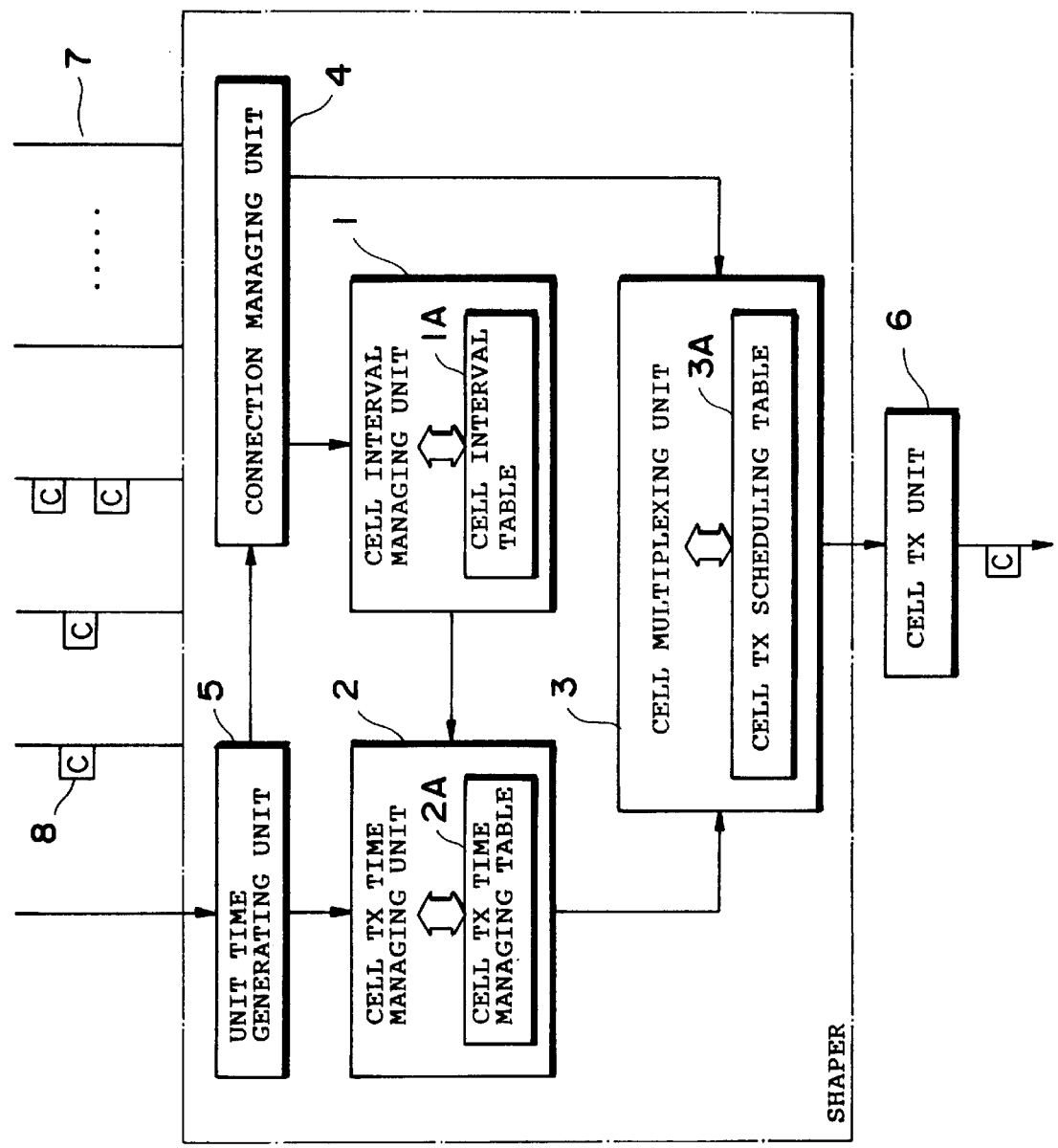
FIG. 7 shows a configuration of a conventional apparatus for controlling cell transmission timing (shaper).

As shown in FIG. 6, the embodiments involve several calculations, such as calculating the cell transmission interval mantissa INCRE using the mantissa m of the cell transmission rate R, calculating the class and the sub-class, and calculating the time SENDTIME and the time NOWTIME, which NOWTIME will be exactly defined later.

The functions of the embodiments are as following.
(1) Third embodiment
  (1-1) Initialization
    Storing SENDTIME: (A)→(B)→(D)→(E)
  (1-2) Change in cell transmission
    Storing SENDTIME: (A)→(B)→(D)→(E)
  (1-3) Occurrence of cell
    Determining QUOTIENT: {(A)→(F)→(H)→(I)} and {(A)→(B)→(D)→(J)}
    Determining step: {(A)→(B)→(K)} and {(A)→(C)→(L)}
  (1-4) After cell transmission
    Storing SENDTIME: (A)→(B)→(D)→(E)
(2) Fourth embodiment
  (2-1) Initialization
    Storing SENDTIME: (A)→(B)→(D)→(E)
  (2-2) Change in cell transmission
    Storing SENDTIME: (A)→(B)→(D)→(E)
  (2-3) Occurrence of cell
    Determining QUOTIENT: (A)→(B)→(D)→(J)
    Determining step: {(A)→(B)→(K)} and {(A)→(C)→(L)}
  (2-4) After cell transmission
    Storing SENDTIME: (A)→(B)→(D)→(E)
    Precalculating for QUOTIENT: (A)→(F)→(H)→(I)
(3) Fifth embodiment
  (3-1) Initialization
    Storing class: (A)→(B)
    Storing sub-class: (A)→(C)
    Storing SENDTIME: {(A)→(B)}→(D)→(E)
  (3-2) Change in cell transmission
    Storing class: (A)→(B)
    Storing sub-class: (A)→(C)
    Storing SENDTIME: {(A)→(B)}→(D)→(E)
  (3-3) Occurrence of cell
    Determining QUOTIENT: (D)→(J)
    Determining step: {(B)→(K)} and {(C)→(L)}
  (3-4) After cell transmission
    Storing SENDTIME: (D)→(E)
    Precalculating for QUOTIENT: (H)→(I)

As shown above, in the third embodiment, calculating the cell transmission interval INCRE (F) is implemented at the occurrence of a cell (1-3). On the contrary, in the fourth embodiment, the calculation (F) is performed after transmission of a cell (2-4). In the fifth embodiment, the class (B) and the sub-class (C), which are calculated at initialization and upon changing the cell transmission rate R, are stored thereat (3-1) and (3-2) so as to be available for subsequent calculations such as calculating the time NOWTIME, and calculating the time SENDTIME, in contrast with the third and fourth embodiments where the class and the sub-class are calculated but not stored.

Third Embodiment

Hereinafter, the third embodiment of the apparatus for controlling the cell transmission timing will be now described. The third embodiment features extracting or selecting a portion from the current time. The extraction or selection depends upon the connections 19, more definitely, the cell transmission rate R. The reason for such filtering or screening is as follows.

The step determination factor QUOTIENT is given on the basis of the current time, namely, the time of the following occurrence. Herein, the information denoting the current time includes much information, such as second information, millisecond information, and nanosecond information. However, obtaining a step determination factor QUOTIENT does not require all of that information; determination of the QUOTIENT depends upon the cell transmission rate as does the determination of the class.

Hereinbelow, the present time or current time is referred to as the current time NOW, which is approximately equivalent to the time THETIME in the first and second embodiments. Also, the portion extracted or selected from the current time NOW is referred to as the following cell transmission time NOWTIME, wherein the time NOWTIME depends upon the class, namely, the cell transmission rate R. The SENDTIME is the same as that in the first and second embodiments.

Determination of Step

The connection managing unit 14 determines in which of the steps 40 a cell 30 to be transmitted should be registered, that is to say, a step determination factor QUOTIENT. The determination is carried out using the time NOWTIME. Herein, the time NOWTIME is defined using the time NOW and each of the bandwidths of the cell transmission queues 18-1~18-n. The time NOWTIME is expressed as follows.

class 0: NOWTIME=NOW
class 1: NOWTIME=NOW/b^w
class 2: NOWTIME=NOW/b^2w
class n-1: NOWTIME=NOW/b^(n-1)w
class n: NOWTIME=NOW/b^nw
class $n_{max}$-1: NOWTIME=NOW/b^($n_{max}$-1)w
class $n_{max}$: NOWTIME=NOW/b^($n_{max}$)w

Operation

Hereinbelow, the operation of the third embodiment will be described. First, if there arises a cell 30 in a connection 19, the connection managing unit 14 obtains the exponent e and the mantissa m from the cell transmission rate R of the connection 19. Next, it determines to which of the cell transmission queues 18 the cell 30 should be assigned, using the exponent e, which gives a class. Thereafter, it extracts a portion of the current time NOW in accordance with the class of the obtained cell transmission queue 18, thereby setting the extracted portion as the time NOWTIME.

Initialization

The connection manage 14 notifies the cell transmission time managing unit 15 of the time NOWTIME. The cell transmission time managing unit 15 stores the time NOWTIME in the cell transmission time table 22, as the time SENDTIME denoting the time at which the preceding cell has been transmitted. Simultaneously, the cell transmission time managing unit 14 defaults the step determination factor QUOTIENT, that is, sets it to zero.

Change in Cell Transmission Rate

If the cell transmission rate of the connection 19 changes from R to R', the following operation is performed. First, the connection managing unit 14 obtains the new exponent e and the new mantissa m from the new cell transmission rate R'. Next, it selects a portion of the current time NOW in accordance with the class of the above cell transmission queue 18, thus obtaining the time NOWTIME. Further, the connection managing unit 14 notifies the cell transmission time managing unit 15 of the time NOWTIME. The cell transmission time managing unit 15 stores the time NOWTIME in the cell transmission time table 22 as the time SENDTIME.

Occurrence of Cell to be Transmitted

If there occurs a cell 30 to be transmitted in a connection, the connection managing unit 14 obtains the addition SUM of the time counter T and the cell transmission interval mantissa INCRE. Thereafter, the connection managing unit 14 divides the addition SUM by (b^$e_{max}$)×k to obtain a quotient, thus setting the quotient as the step determination factor QUOTIENT. Simultaneously, the connection managing unit 14 develops the time counter T, using the remainder. This processing advances pursuant to the above expressions (11)~(15).

Using the time SENDTIME and the time NOWTIME, the connection managing unit 14 implements the expressions (18) and (19), thereby determining the step determination factor QUOTIENT.

If m≦m', QUOTIENT=max (0, QUOTIENT−(NOWTIME−SENDTIME)) (18)

If m>m', QUOTIENT=max (0, QUOTIENT−(NOWTIME−SENDTIME)) (19)

Subsequently, the connection managing unit 14 determines the step 40 based upon the QUOTIENT, the class, and the sub-class, thereby registering the cell 30 in the step 40. The registered cell is shifted toward the head step Q0 by one unit time; once the cell 30 reaches the head step Q0, the cell 30 is permitted to be transmitted.

Operation After Cell Transmission

After cell transmission, the connection managing unit 14 extracts a portion of the current time NOW in accordance with the cell transmission rate of the connection to obtain the time NOWTIME, whereby the connection managing unit 14 notifies the cell transmission time managing unit 15 of the obtained NOWTIME. Thereafter, the cell transmission time managing unit 15 stores the NOWTIME in the cell transmission time table 22 as the SENDTIME. In this way, the NOWTIME for the preceding cell will be available as the SENDTIME for the following cell.

As described above, the third embodiment obtains the time NOWTIME by extracting a portion from the time NOW on the basis of the cell transmission rate R of the connection 19. Hence the storage area for storing time information necessary to calculate the QUOTIENT is reduced.

Fourth Embodiment

Hereinafter, the fourth embodiment of the apparatus for controlling the cell transmission timing according to this invention will be described. The configuration and function of the fourth embodiment are almost the same as those of the third embodiment, whereas the function of the cell interval managing unit 13 in this embodiment differs from that in the third embodiment. More specifically, the cell interval manger 13 of the embodiment notifies the connection managing unit 14 of the cell transmission interval mantissa INCRE corresponding to the mantissa m of the cell transmission rate of the connection, after cell transmission in lieu of at cell occurrence in the third embodiment. This enables dispersing processes for a plurality of cells that have occurred simultaneously.

The differences between the fourth embodiment and the third embodiment, are in the operation at cell occurrence and the operation after cell transmission. Hereinbelow, therefore those operations will be described.

Operation at Cell Occurrence

If there arises a cell 30 in a connection 19, the cell transmission time managing unit 15 reads out the SEND-TIME regarding the connection 19 from the cell transmission time table 22, to the connection managing unit 14. The connection managing unit 14 implements the expressions (20) and (21) using the NOWTIME and the SENDTIME, thereby obtaining the step determination factor QUOTIENT.

If $m \leq m'$, QUOTIENT=max (0, QUOTIENT−(NOWTIME−SENDTIME)) (20)

If $m > m'$, QUOTIENT=max (0, QUOTIENT−(NOWTIME−SENDTIME)) (21)

The other functions are the same as those of the third embodiment.

Operation After Cell Transmission

After cell transmission, the connection managing unit 14 extracts a portion of the time NOW according to the cell transmission rate of the connection to obtain the time NOWTIME, and notifies the cell transmission time managing unit 15 of the same. The cell transmission time managing unit 15 stores the time NOWTIME in the cell transmission time table 22 as the time SENDTIME. At this time, the connection managing unit 14 calculates the addition SUM of the time counter T and the cell transmission interval mantissa INCRE. Further, the connection managing unit 14 divides the SUM by $(b^{e_{max}}) \times k$ to obtain the step determination factor QUOTIENT. Also, it develops the time counter T using the remainder. Those values are indicated by the expressions (11)~(15).

As described above, according to the fourth embodiment, preparation for values necessary to obtain the step determination factor QUOTIENT is carried out after cell transmission. Therefore, even if a plurality of cells occur simultaneously, the preparation for values necessary to obtain the respective QUOTIENTS does not need to be performed at the cell transmission, thereby avoiding concentration of those processes.

Fifth Embodiment

The configuration and function of the fifth embodiment is roughly similar to the those of the third and fourth embodiments. The fifth embodiment features the operations of the connection managing unit 14 and the cell interval managing unit 13. More definitely, in the fifth embodiment, storing the class and the sub-class are performed at initialization and at changing in the cell transmission rate R. The class and the sub-class are available for processes that follow such a storing. For example, when extracting a portion of the time NOW to obtain the time NOWTIME, the connection managing unit 14 uses the class. When registering the cell in a step, the connection managing unit 14 uses the sub-class.

Since preparation for values to give a step determination factor QUOTIENT requires the cell interval mantissa INCRE according to the mantissa m of the cell transmission rate R, the cell interval managing unit 13 notifies the connection managing unit 14 of the INCRE, after cell transmission and at cell occurrence.

Initialization

Assuming that the cell transmission rate of one connection 19 is R1, upon initialization for the connection 19, the connection managing unit 14 stores the class and the sub-class given using the exponent e1 and the mantissa m1 of the cell transmission rate R1. On the other hand, the connection managing unit 14 extracts a part of the current time NOW corresponding to the class to obtain the time NOWTIME, thus notifying the cell transmission time managing unit 15 of the same. The cell transmission time managing unit 15 stores the time NOWTIME in the cell transmission time table 22 as the time SENDTIME. Simultaneously, the connection managing unit 14 obtains the cell transmission interval mantissa INCRE from the mantissa m1 of the cell transmission rate R1 of the connection 19, which is stored in the cell interval table 22 by the cell interval managing unit 13. Further, the connection managing unit 14 defaults the step determination factor QUOTIENT, namely, sets it to zero. To summarize, the initialization permits the class and the sub-class to be stored as well as the time SENDTIME.

Change in Cell Transmission Rate

If the cell transmission rate of the connection 19 changes from R1 to R2, the connection managing unit 14 stores the class and the sub-class given using the exponent e2 and the mantissa m2 of the cell transmission rate R2. Moreover, the connection managing unit 14 selects a portion of the current time NOW to obtain the time NOWTIME, thus notifying the cell transmission time managing unit 15 of the time NOWTIME. The cell transmission time managing unit 15 stores the time NOWTIME in the cell transmission time table 22 as the time SENDTIME. At this time, the connection managing unit 14 obtains the cell transmission interval mantissa INCRE from the mantissa m2 of the cell transmission rate R2 of the connection 19, whereby the cell interval managing unit 13 stores the transmission interval mantissa INCRE in the cell interval table 22. In summary, changing the cell transmission rate allows the class and the sub-class to be stored as well as the time SENDTIME, similarly to the initialization.

Operation at Cell Occurrence

The connection managing unit 14 obtains the addition SUM of the time counter T and the cell transmission interval mantissa INCRE, and divides the addition SUM by the $(b^{e_{max}}) \times k$ in order to obtain the step determination factor QUOTIENT. Thereafter, the connection managing unit 14 updates the time counter T using the remainder. Those values are shown by the expressions (11)~(15).

The connection managing unit 14 implements the expressions (11) and (12), using the time SENDTIME and the time NOWTIME, thus determining the step determination factor QUOTIENT. Thereafter, the connection managing unit 14 determines the step on the basis of the step determination factor QUOTIENT, the class, and the sub-class to register the cell therein. Cells registered in such a way are shifted toward to the head step Q0, whereby the cell that arrives thereat is permitted to be transmitted.

Operation After Cell Transmission

The connection managing unit 14 extracts a portion of the current time NOW corresponding to the cell transmission rate R of the connection, thereby generating the time NOW-TIME to notify the cell transmission time managing unit 15 of the same. The cell transmission time managing unit 15 stores the time NOWTIME in the cell transmission time table 22 as the time SENDTIME.

At this time, the connection managing unit 14 obtains the addition SUM of the time counter T and the cell transmission interval mantissa INCRE to divide it by $(b^{\hat{}}e_{max}) \times k$, thus setting the quotient of the division as the step determination factor QUOTIENT. The values are indicated by the expressions (11)–(15).

As described above, in accordance with the fifth embodiment, both of the class and the sub-class are stored at the initialization and the changing the cell transmission rate. Therefore, a step determination factor QUOTIENT can be obtained without repetitive calculation of the class and the sub-class, which leads to reduction of calculation time.

Other Embodiment

The above embodiments employs the expressions (5), (6), (12), and (13) in order to obtain the cell transmission interval mantissa INCRE. However, in lieu of the expressions (5) and (6), the following expression may be available.

$$\text{INCRE} = (R_{max}/f(m)) \times k \quad (22)$$

Also, in lieu of the expressions (12) and (13), the following expressions (23)–(26) may be available.

$$\text{If } m \leq m', \text{QUOTIENT} = \text{floor} (\text{SUM}, (b^{\hat{}}e_{max}) \times k) \quad (23)$$

$$T = \text{SUM} - \text{QUOTIENT} \times ((b^{\hat{}}e_{max}) \times k) \quad (24)$$

$$\text{If } m > m', \text{QUOTIENT} = \text{floor} (\text{SUM}, (b^{\hat{}}(e_{max}-1)) \times k) \quad (25)$$

$$T = \text{SUM} - \text{QUOTIENT} \times (b^{\hat{}}(e_{max}-1) \times k) \quad (26)$$

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for controlling cell transmission timing, which determines a following cell transmission time of transmitting a following cell that follows a preceding cell, using a preceding cell transmission time of transmitting the preceding cell and a time interval specified by a cell transmission rate of a connection along which the preceding cell and the following cell flow, to register the following cell in a step so as to be transmitted at the following cell transmission time, the apparatus for controlling cell transmission timing comprising:

an accommodation circuit accommodating a plurality of connections along which a plurality of cells flow, each of the plurality of connections being allocated a cell transmission rate represented with a cardinal number, an exponent, and a function of a mantissa;

a plurality of cell transmission queues, each being allocated a bandwidth for transmitting the plurality of cells and temporarily storing the plurality of cells, each of the plurality of cell transmission queues having a plurality of steps, each of the plurality of steps having registered therein one cell among the plurality of the cells, registered cells shifting toward a given step thereby permitting a cell shifted therein to be transmitted; and a managing circuit controlling registering of the one cell in one of the plurality of steps in the plurality of queues, using the cardinal number, the exponent, and the function of the mantissa of the connection of the one cell.

2. An apparatus for controlling cell transmission timing, which determines a following cell transmission time of transmitting a following cell that follows a preceding cell, using a preceding cell transmission time of transmitting the preceding cell and a time interval specified by a cell transmission rate of a connection along which the preceding cell and the following cell flow, to register the following cell in a step so as to be transmitted at the following cell transmission time, the apparatus for controlling cell transmission timing comprising:

an accommodation circuit accommodating a plurality of connections along which a plurality of cells flow, each of the plurality of connections being allocated a cell transmission rate represented with a cardinal number, an exponent, and a function of a mantissa;

an interval circuit calculating the time interval using the function of the mantissa of the cell transmission rate allocated to the connection;

a plurality of cell transmission queues, each being exponentially allocated a bandwidth for transmitting the plurality of cells and temporarily storing the plurality of cells, each of the plurality of cell transmission queues being identified by a class and having a plurality of steps, each of the plurality of steps having registered therein one cell among the plurality of the cells, registered cells shifting toward a given step thereby permitting a cell shifted therein to be transmitted;

a class circuit calculating a class of a cell transmission queue in which a cell is registered, using the exponent;

a sub-class circuit calculating a sub-class in a class, using the exponent;

a quotient circuit calculating a quotient using the preceding cell transmission time of transmitting the preceding cell, the time interval, the cardinal number, and the exponent;

a look-up table used for retrieving a step in which the cell is registered;

a time circuit updating the preceding cell transmission time of transmitting the preceding cell;

a step circuit determining a step from the look-up table, using the class, the sub-class, and the quotient; and a registration circuit registering the cell in the determined step.

3. An apparatus for controlling cell transmission timing as set forth in claim 2, further comprising a circuit obtaining a delay time between the preceding cell transmission time of transmitting the preceding cell and the time of occurrence of the following cell, wherein the quotient circuit corrects the quotient using the delay time, and the step circuit determines the step on the basis of the corrected quotient.

4. An apparatus for controlling cell transmission timing as set forth in claim 3, further comprising a first extraction circuit extracting a first information portion from information denoting the preceding cell transmission time of transmitting the preceding cell, in accordance with the cell transmission rate of the connection; and a second extraction circuit extracting a second information portion from information denoting the time of occurrence of the following cell, in accordance with the cell transmission rate of the connection, wherein the step circuit corrects the quotient using the first information portion and the second information portion.

5. An apparatus for controlling cell transmission timing as set forth in claim 4, wherein the calculation by the interval circuit and the updating by the time circuit are implemented at the occurrence of the following cell.

6. An apparatus for controlling cell transmission timing as set forth in claim 4, wherein the calculation by the interval circuit and the updating by the time circuit are implemented after transmission of the preceding cell.

7. An apparatus for controlling cell transmission timing as set forth in claim 4, wherein the calculation by the class circuit and the calculation by the sub-class circuit are implemented upon an initialization of controlling cell transmission timing, and are stored to be available for the calculation by the quotient circuit.

8. An apparatus for controlling cell transmission timing as set forth in claim 4, wherein the calculation by the class circuit and the calculation by the sub-class circuit are implemented upon a change in cell transmission rate, and are stored to be available for the calculation by the quotient circuit.

9. An apparatus for controlling cell transmission timing, which controls cell transmission in such a manner that a cell transmission rate of each of a plurality of connections to be controlled corresponds to a given transmission rate, the apparatus for controlling cell transmission timing comprising:

a plurality of queues each corresponding to a plurality of transmission frequency bands;

queue management means for shifting a one of the connections positioned at each of a plurality of steps constituting the queues with frequency corresponding to the transmission rate, and for transmitting a cell transmission request from a connection positioned in the head of the steps in turn;

cell transmission management means for determining to which transmission rate each connection belongs, and for determining at which of the steps corresponding to the transmission band the connection is positioned, based upon a cell transmission rate given by a mantissa and a following cell transmission request target value given by a time counter value corresponding to the mantissa, the cell transmission rate for each connection being expressed using an exponent and a mantissa; and cell transmission means for transmitting a cell for a connection that receives a cell transmission request from one of the plurality of queues.

10. An apparatus for controlling cell transmission timing as set forth in claim 9, wherein the cell interval management means obtains a cell transmission interval mantissa corresponding to each connections from among a plurality of cell transmission interval mantissas calculated on all of the mantissas in advance.

11. An apparatus for controlling cell transmission timing as set forth in claim 9, wherein the cell interval management means converts, for each queue, an elapsed time after transmission of a preceding cell into a number of steps for each queue, and advances by said number of steps the position of the step in which the connection is positioned from the position of the step determined based upon the following cell transmission request target value, in determining in which of the steps in the queues the connection is positioned.

12. An apparatus for controlling cell transmission timing as set forth in claim 9, wherein the queue management means carries out shifting of connections in the steps with frequency corresponding to the transmission band corresponding to the queue on the basis of link information as to the number of connections that the queue corresponding to each of the plurality of transmission bands is capable of accommodating and first and last connection information on each of the steps for each queue.

13. An apparatus for controlling cell transmission timing, which manages cell transmission timing on the basis of a transmission queue corresponding to a transmission band to which a cell transmission rate belongs, a plurality of transmission queues corresponding to each of the bands big defined through exponential division of the transmission band, the apparatus for controlling cell transmission timing comprising:

transmission queue management means for shifting each connection registered in each step of each transmission queue at time intervals corresponding to said each transmission queue and outputs a cell transmission request according to said each transmission queue upon arrival at a head step;

following cell transmission time calculation means for filtering a current time controlled by a system in initializing connections and/or in updating cell transmission rates in accordance with the cell transmission rate for each connection, and storing a transmission time corresponding to the cell transmission rate as a transmission time of a preceding cell;

means for obtaining a cell transmission interval mantissa giving a transmission interval of the connection and a following cell transmission request target value related to the connection from a time counter value corresponding to the cell transmission interval mantissa and obtaining a temporal value of a step determination factor used for specifying a position of the step in the transmission queue in which the connection is registered on the basis of the target value upon occurrence of a cell;

means for finally determining a step determination factor by calculating a difference between the transmission time of the preceding cell and the transmission time calculated through filtering the current time controlled by the system, to take into consideration a time that elapses before occurrence of a new cell after transmission of the preceding cell;

connection registration means for registering each connection in a given step position on the corresponding transmission queue on the basis of the finally determined step determination factor; and cell transmission means, responsive to a cell transmission request transmitted from a transmission queue, for transmitting a cell of a connection corresponding to the cell transmission request via a transmission path.

14. An apparatus for controlling cell transmission timing, which manages cell transmission timing on the basis of a transmission queue corresponding to a transmission band to which a cell transmission rate belongs, a plurality of transmission queues corresponding to each of the bands being defined through exponential division of the transmission band, the apparatus for controlling cell transmission timing comprising:

transmission queue management means for shifting each connection registered in each step of each transmission queue at time intervals corresponding to said each transmission queue and outputs a cell transmission request according to said each transmission queue upon arrival at a head step;

following cell transmission time calculation means for filtering a current time controlled by a system in initialing connections and/or in updating cell transmission rates in accordance with the cell transmission rate for each connection, and storing a transmission time corresponding to the cell transmission rate as a transmission time of a preceding cell;

means for obtaining a cell transmission interval mantissa giving a transmission interval of the connection and a following cell transmission request target value related to the connection from a time counter value corresponding to the cell transmission interval mantissa and obtaining a temporal value of a step determination factor used for specifying a position of the step in the transmission queue in which the connection is registered on the basis of the target value after transmission of a cell;

means for finally determining a step determination factor by calculating a difference between a transmission time of the preceding cell and the transmission time calculated through filtering the current time controlled by the system, to take into consideration a time that elapses before occurrence of a new cell after the transmission of the preceding cell upon occurrence of a cell;

connection registration means for registering each connection in a given step position on the corresponding transmission queue on the basis of the finally determined step determination factor; and cell transmission means, responsive to a cell transmission request transmitted from a transmission queue, for transmitting a cell of a connection corresponding to the cell transmission request via a transmission path.

15. An apparatus for controlling cell transmission timing, which manages cell transmission timing on the basis of a transmission queue corresponding to a transmission band to which a cell transmission rate belongs, a plurality of transmission queues corresponding to each of the bands being defined through exponential division of the transmission band, the apparatus for controlling cell transmission timing comprising:

transmission queue management means for shifting each connection registered in each step of each transmission queue at time intervals corresponding to said each transmission queue and outputs a cell transmission request according to said each transmission queue upon arrival at a head step;

class and sub-class determining means for obtaining and storing a transmission queue corresponding to the cell transmission rate of the connection, a class, and a sub-class, which specify a transmission bandwidth thereof upon initialization of a connection and/or upon updating a cell transmission rate;

means for obtaining a mantissa of a step determination factor used for specifying a step position in a queue in which the connection is registered and for determining a transmission queue and a step position finally with reference to the class and the sub-class obtained and stored by the class and sub-class determining means upon initializing the connection and/or updating the cell transmission rate in determining the transmission queue and the step position of the queue in which the connection is registered;

connection registration means for registering each connection in a given step position on the corresponding transmission queue on the basis of determination by the step determination determining means; and cell transmission means, responsive to a cell transmission request transmitted from a transmission queue, for transmitting a cell of a connection corresponding to the cell transmission request via a transmission path.

* * * * *